A. G. JOHNSON.
CRANK SHAFT HOLDER.
APPLICATION FILED JULY 14, 1919.
1,383,634.  Patented July 5, 1921.
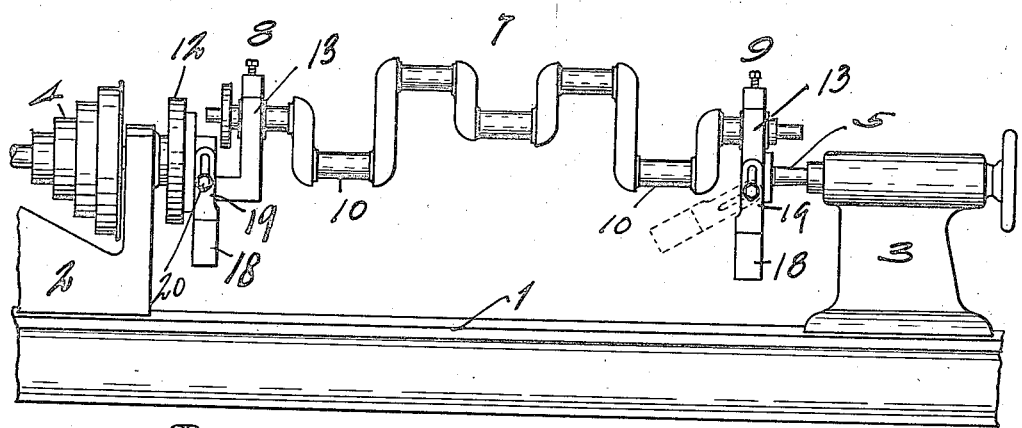
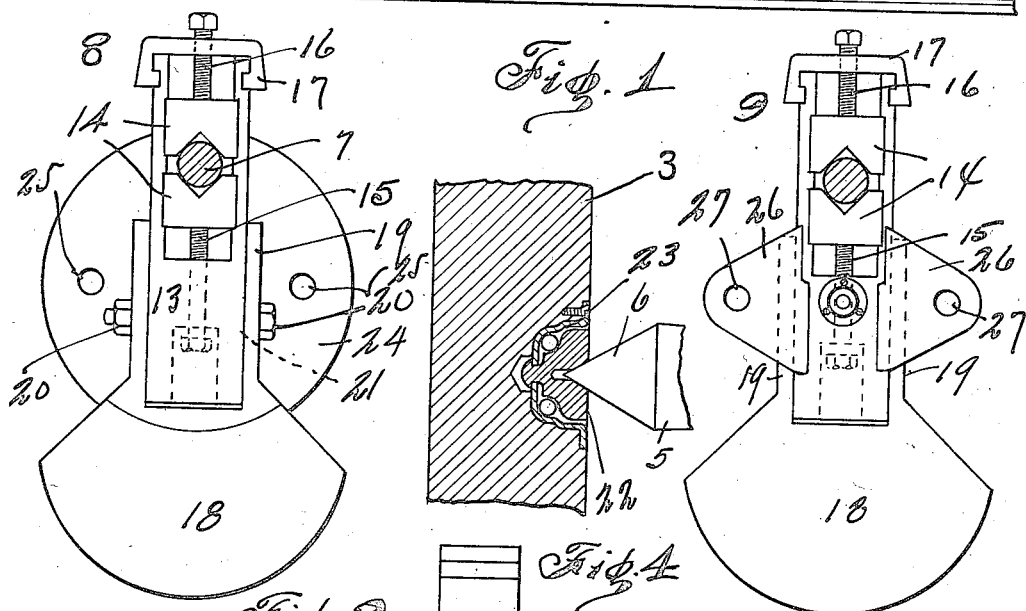
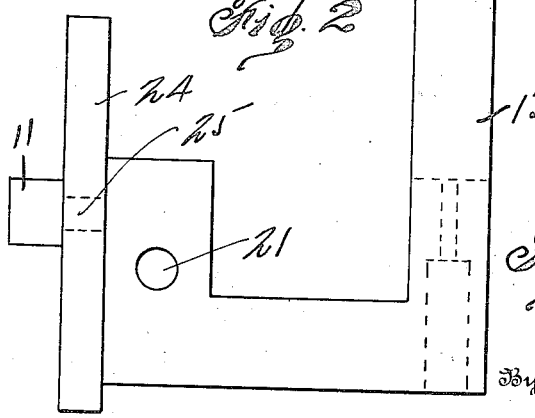
Inventor
Arthur G. Johnson
By Herbert E. Smith
Attorney

UNITED STATES PATENT OFFICE.

ARTHUR G. JOHNSON, OF SPOKANE, WASHINGTON.

CRANK-SHAFT HOLDER.

1,383,634.  Specification of Letters Patent.  Patented July 5, 1921.

Application filed July 14, 1919. Serial No. 310,705.

*To all whom it may concern:*

Be it known that I, ARTHUR G. JOHNSON, a citizen of the United States, residing at Spokane, in the county of Spokane and State of Washington, have invented certain new and useful Improvements in Crank-Shaft Holders, of which the following is a specification.

The present invention relates to improvements in crank shaft holders designed for use in connection with turning lathes for properly centering and holding the crank shaft in position while the bearings are being ground or turned, and the primary object of the invention is the provision of an attachment that may with facility be adapted to different types of lathes or grinding machines and the crank shaft supported therein.

The invention consists in certain novel combinations and arrangements of parts as will be hereinafter more specifically pointed out and claimed.

In the accompanying drawings one complete example of the physical embodiment of the invention is illustrated, applied to the standard face plate and spindle of the head stock and tail stock respectively of the lathe, the parts being combined and arranged according to the best mode so far devised for the practical application of the principles of the invention.

Figure 1 is a view in side elevation showing a crank shaft supported in the lathe according to the present invention, and ready for turning.

Fig. 2 is an enlarged view of the head block of the shaft holder.

Fig. 3 is a similar view of the tail block of the shaft holder.

Fig. 4 illustrates in section a portion of the tail block with an anti-friction bearing for the tail stock center.

Fig. 5 is an enlarged side view of the head block or shaft holder attached to the head plate in Fig. 1.

In the preferred embodiment of the invention as illustrated in the drawings the well known form of turning lathe is designated by the numeral 1 having the head stock 2 and tail stock 3, together with the driving pulleys or drum 4, and the spindle 5 on the tail stock provided with a centering cone 6 as usual. The shaft 7 is illustrated as supported between the two holders designated as 8 and 9, the numerals indicating as holes the head block or holder and the tail block or holder for supporting the crank shaft and these holders or blocks revolve with the shaft while its bearings as 10 are turned or ground. The shaft is supported with these bearings 10 centered with the operating parts of the lathe, and the holder 8, as best seen in Fig. 5 is fashioned with an arbor 11 which is fitted to revolve with the disk or face plate 12 of the lathe, and the face plate in turn revolves with the pulleys or drum 4.

The two ends of the shaft are directly supported by the holders, one of which, 8, has a slotted head 13 to accommodate the pair of centering blocks 14 arranged in pairs to grip the shaft. The block or holder 9 has a similar pair of gripping or centering blocks, and in both instances a pair of set screws or bolts 15 and 16 are employed to adjust and retain the blocks 14 in position in the slotted frame members of the holders. The set screw 16 is threaded in a slide cap 17 on top of the slotted member of each holder and the set screw 15 is threaded in the holder at a point diametrically opposite the screw 16.

To balance the crank shaft in the supports or holders, each holder is provided with an adjustable counterweight 18, fashioned with a pair of slotted arms 19 and these arms are pivoted on the holder through the instrumentality of bolt 20 passing through the slotted arms and the holder. An opening 21 is provided in the holder for the pivot bolt 20, and it will readily be apparent that the weights may be adjusted toward or away from the axial center of the shaft to counterbalance the crank shaft, by sliding the slotted arms on the bolt and securing the bolt to hold the slotted arms in adjusted position. In Fig. 1, in dotted lines, one of the weights is shown in position swung out from the holder in order that access may be had to the set bolt 15 for turning it in centering the shaft in its bearings.

The two holders are substantially the same in performing their functions, but are somewhat different in construction to adapt them for different types of lathes. Thus the holder 9 has a bearing cone 22 for the tapered end 6 of the spindle 5, and the cone is seated in a recess 23 in the face of the holder, to reduce and eliminate friction on the centering tapered point 6 of the spindle 5.

The holder 8 is illustrated with a circular plate 24 having holes or openings 25, and the holder 9 has flanges 26 with openings 27, and these elements adapt the holders for use with standard forms of grinders or shaft grinding machines which include two heads to which these plates and flanges may be bolted through the openings 25 and 27, to support the holders and shaft. Thus the holders, as attachments are applicable for use in a variety of ways for supporting the crank shaft and centering it properly for accurate work in grinding.

What I claim is—

1. The combination with a lathe and a pair of holders each having adjustable centering and retaining blocks for a shaft, a counterweight for each holder formed with spaced arms pivoted to the holder, means for permitting adjustment of the counterweights with relation to their holders, and means for attaching the holders to supporting and operating parts of the lathe.

2. The combination with a lathe of a holder having adjustable centering and retaining blocks for a shaft, of a counterweight having slotted spaced arms embracing a portion of the holder, a bolt passed through said slotted arms and holder for retaining said weight in adjusted position, and means for attaching said holder to supporting and operating parts of the lathe.

In testimony whereof I affix my signature.

ARTHUR G. JOHNSON.